US009616262B2

(12) United States Patent
Bodemann

(10) Patent No.: US 9,616,262 B2
(45) Date of Patent: Apr. 11, 2017

(54) DYNAMIC DEOXYGENATION OF WATER FOR FIRE PROTECTION SYSTEM

(71) Applicant: South-Tek Systems, LLC, Raleigh, NC (US)

(72) Inventor: Timothy S. Bodemann, Raleigh, NC (US)

(73) Assignee: South-Tek Systems, LLC, Wilmington, NC (US)

( * ) Notice: Subject to any disclaimer, the term of this patent is extended or adjusted under 35 U.S.C. 154(b) by 123 days.

(21) Appl. No.: 14/599,723

(22) Filed: Jan. 19, 2015

(65) Prior Publication Data

US 2015/0151151 A1   Jun. 4, 2015

Related U.S. Application Data

(63) Continuation-in-part of application No. 13/589,542, filed on Aug. 20, 2012, now abandoned.

(51) Int. Cl.
| | |
|---|---|
| *A62C 35/00* | (2006.01) |
| *A62C 35/68* | (2006.01) |
| *A62C 35/60* | (2006.01) |
| *F16L 58/00* | (2006.01) |
| *B08B 9/032* | (2006.01) |

(52) U.S. Cl.
CPC .............. *A62C 35/68* (2013.01); *A62C 35/60* (2013.01); *F16L 58/00* (2013.01); *B08B 9/0328* (2013.01); *Y10T 137/0419* (2015.04)

(58) Field of Classification Search
CPC ......... Y10T 137/0419; Y10T 137/7722; Y10T 137/7897; F16K 31/44

USPC .. 169/43, 17, 11; 251/12, 66, 67, 72, 73, 83
See application file for complete search history.

(56) References Cited

U.S. PATENT DOCUMENTS

| | | | | |
|---|---|---|---|---|
| 6,960,321 | B1 * | 11/2005 | Ludwig ..................... | A61L 2/07 134/18 |
| 2006/0283877 | A1 * | 12/2006 | Bodemann ........... | B67D 1/0878 222/53 |
| 2010/0263882 | A1 * | 10/2010 | Bodemann ............. | A62C 35/62 169/17 |
| 2011/0226495 | A1 * | 9/2011 | Burkhart ................ | A62C 35/62 169/16 |

\* cited by examiner

*Primary Examiner* — Justin Jonaitis
(74) *Attorney, Agent, or Firm* — Coat & Bennett, PLLC

(57) ABSTRACT

A corrosion prevention treatment of wet Fire Protection System (FPS) includes purging the pipes of O2 with an inert gas such as N2, followed by filling the pipes with deoxygenated water generated "on the fly" as the water enters a building, using one or more Gas Transfer Membrane (GTM) devices and N2 gas. The GTM device eliminates the need for a water reuse tank and its associated pipes, valves, recirculation regimen, and the like. Water is pumped directly from the building water supply to a GTM device, where it is deoxygenated to very low O2 levels—such as below 300 ppb (parts per billion). The deoxygenated water then flows directly into the O2-purged pipes of the FPS. When the FPS is drained for testing or repair, the deoxygenated water may be discharged, and replaced, upon return to service of the FPS, with water freshly deoxygenated from the building supply as the FPS piping is filled.

9 Claims, 4 Drawing Sheets

DYNAMIC DEOXYGENATION OF WATER FOR FIRE PROTECTION SYSTEM

RELATED APPLICATIONS

This application is a Continuation-in-Part of U.S. patent application Ser. No. 13/589,542, titled "Deoxygenated Water Fill for Fire Protection System", filed Aug. 20, 2012.

FIELD OF INVENTION

The present invention relates generally to wet fire protection systems, and in particular to a system and method of dynamically deoxygenating supply water as the pipes are filled.

BACKGROUND

Fire sprinkler systems are a well-known type of active fire suppression system. Sprinklers are installed in all types of buildings, commercial and residential, and are generally required by fire and building codes for buildings open to the public. Typical sprinkler systems comprise a network of pipes, usually located at ceiling level, that are connected to a reliable water source. Automatically actuated valves called sprinkler heads are disposed along the pipes at regular intervals. Each sprinkler head is operative to open automatically in the event of a fire. For example, one design of sprinkler head includes a fusible element, or a frangible glass bulb, that is heat-sensitive and designed to fail at a predetermined temperature. Failure of the fusible element or glass bulb opens the valve, allowing water to flow through the head, where it is directed by a deflector into a predetermined spray pattern. Sprinkler systems may suppress a fire, or inhibit its growth, thereby saving lives and limiting inventory loss and structural damage. Sprinkler specifications are published by the National Fire Protection Association (e.g., NFPA 13, 13D, 13R).

The sprinkler system (more generally, Fire Protection System, or FPS) is fed from a pump room or riser room. In a large building the FPS consist of several "zones," each being fed from a riser in the pump room. The riser contains a main isolation valve and other monitoring equipment (e.g., flow switches, alarm sensors, and the like). The riser is typically a 6 or 8 inch diameter pipe coupled through a booster pump (called the fire pump) to the main water supply to the building. The riser then progressively branches off into smaller "cross mains" and branch lines, also known as "zones". At the furthest point from the riser, typically at the end of each zone, there is an "inspector's test port," which is used for flow testing. Numerous other valves, such as for filling and/or purging the pipes, testing internal pressure, measuring gas or water properties, and the like, may be included in the FPS pipes.

FPS may be of the "wet" or "dry" types. In a "wet" system the sprinkler pipes in each room are full of water under a predetermined "internal set point" pressure. If the water pressure decreases below the set point, valves are opened and/or a pump is activated, and water flows into the sprinkler pipes in an attempt to maintain the pressure. The set point pressure drops when water escapes the system, such as due to the opening of a sprinkler head in a fire.

To prevent damage to equipment or merchandise by water leaking from the FPS in conditions other than a fire, and in environment conditions in which water in the pipes may freeze, "dry" system are used. A dry FPS uses compressed air in the piping as a "supervisory gas." The air is maintained at a supervisory pressure, e.g., typically ranging between 13-40 PSI. When a sprinkler head opens, the air pressure drops to atmospheric (e.g., 0 PSI), and a valve opens in response to the lower pressure. The valve locks in the open position and water rushes into the system. One type of dry FPS, known as a pre-action, provides increased protection against water damage by increasing the probability that the system is only activated by an actual fire. A pre-action FPS requires one (e.g., Single Interlock) or more (e.g., Double Interlock) action signals before water is injected into the system—for example, both a drop in supervisory air pressure and a signal from a heat or smoke detector.

Building codes specify a minimum angle, measured from the horizontal, at which wet FPS pipe is to be hung. The purpose of this angle is to ensure that water flows to the end of the pipe, so that the internal volume of the pipe is full of water along its entire length, minimizing the delay in water discharge when a sprinkler head opens. Also, codes specify that air vents can be installed at the far end of each pipe from the street valve, to purge air from the pipe interior as the system is "charged" (i.e., when water is initially introduced). However, in practice, there are usually one or more "high" or elevated points in the FPS wet pipe system where air is trapped. This air includes oxygen ($O_2$), which reacts with the water and pipe steel to cause corrosion, which may be of either galvanic or organic origin. Sometimes, microbes can grow in the water and accelerate the corrosion by means of the byproducts produced during their metabolic cycle. This is called Microbiologically Influenced Corrosion (MIC). Over time, MIC or galvanic corrosion can cause extensive damage to a wet FPS, eventually resulting in leaks. Both the damage caused by leaking water, and the need to replace corroded FPS pipes, provide significant incentive to minimize or eliminate wet FPS corrosion due to $O_2$ within the pipes.

One approach to solving this problem is to purge atmospheric air from the FPS pipes using an inert gas, such as nitrogen ($N_2$), prior to charging the system. Nitrogen is an inert gas, and pure $N_2$ contains no oxygen. However, commercially common means of generating $N_2$, such as by membrane-filtering atmospheric air, generate $N_2$ in the range of 95%-98% purity and Pressure Swing Adsorption systems generate $N_2$ in the range of 95%-99.999% purity; accordingly, this $N_2$ may contain some concentration of $O_2$. Additionally, nitrogen has a dew point of $-40°$ F., meaning it can absorb water vapor (as well as other gases dissolved in the water) at any higher temperature.

Water usually contains dissolved oxygen—that is, $O_2$ molecules, apart from the oxygen bound up in the $H_2O$ molecules forming the water itself. As one example, a test of local city water at 60 degrees F. in Charlotte, N.C. revealed an $O_2$ content of 9.617 ppm (parts per million). Due to the partial pressure of gases, $O_2$ from such water will outgas into the pockets containing $N_2$, providing enough $O_2$ for the onset of detrimental corrosion. Accordingly, simply purging wet FPS pipes with $N_2$ prior to charging the system is not a long-term solution to corrosion.

Deoxygenating water—the process of reducing the number of free oxygen molecules dissolved in water—prior to charging a wet FPS system is known. Water may be deoxygenated by exposure to low-$O_2$-concentration gas and/or vacuum conditions to draw $O_2$ and other residual free gasses out of the water, causing the dissolved $O_2$ to "outgas" into the lower-concentration gas or vacuum. It is known to use $N_2$ gas to deoxygenate water for wet FPS systems. For example, U.S. Patent Application Publication No. 2011/0226495 discloses a wet FPS system having a water reuse tank and in-line static mixer. The reuse tank is filled with sufficient fresh water to fill the FPS pipe volume. This water is circulated from the tank through the in-line static mixer, with N2 gas being injected in the circulation line from an N2 generator. The water is circulated through the in-line static mixer until a desired level of deoxygenation is achieved. As this reference discloses, such a system is effective to deoxygenate water to approximately 0.1 ppm (parts per million) of O2. When the FPS is drained for testing or maintenance, the deoxygenated water is retained in the water reuse tank, for reuse when the FPS is again made operational. Reusing the water avoids the need to spend the considerable time required to deoxygenate fresh water by circulation through the in-line static mixer.

The system disclosed in US 2011/0226495 presents numerous deficiencies. A water reuse tank of sufficient volume to hold all of the water in the wet FPS is required. Such a tank is large and heavy, requiring ample space and possibly structural reinforcement to deploy it in many buildings. The oxygenation process is lengthy, requiring continuous recirculation of water in the reuse tank through the in-line static mixer, in the presence of N2 gas, to achieve a sufficient level of deoxygenation. Additionally, separate piping systems for circulating water and gas to/from the reuse tank, each with multiple valves that must be coordinated and controlled, result in significant complexity and cost, increase maintenance requirements, and introduce potential failure points. Furthermore, such a system may ultimately limit the amount of deoxygenation that can be achieved, leaving some residual amount of O2 gas dissolved in the water, which may eventually outgas into the FPS piping.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments described and claimed herein, a corrosion prevention treatment of wet FPS including purging the pipes of O2 with an inert gas such as N2, followed by filling the pipes with deoxygenated water generated "on the fly" as the water enters a building, using one or more Gas Transfer Membrane (GTM) devices and N2 gas. The GTM device eliminates the need for a water reuse tank and its associated pipes, valves, recirculation regimen, and the like. Water is pumped directly from the building water supply to a GTM device, where it is deoxygenated to very low O2 levels—such as below 300 ppb (parts per billion). The deoxygenated water then flows directly into the O2-purged pipes of the FPS. When the FPS is drained for testing or repair, the deoxygenated water may be discharged, and replaced, upon return to service of the FPS, with water freshly deoxygenated from the building supply as the FPS piping is filled.

One embodiment relates to a method of suppressing corrosion in a wet fire protection system including at least one pipe. Each pipe includes a plurality of automatically activated valves operative to open and discharge water in the event of a fire. The system further includes at least gas fill and purge valves located at spaced-apart distances in one or more pipes. Atmospheric oxygen is purged from the pipes by injecting a first inert gas into at least one gas fill valve, and discharging oxygen displaced by the first inert gas via at least one gas purge valve. A Gas Transfer Membrane (GTM) deoxygenating device is interposed between a building water supply and the wet fire protection system pipes and the first inert gas is supplied to the GTM device. After purging oxygen from the pipes, water is directed from the building water supply through the GTM device, where it is deoxygenated to an oxygen concentration of 500 ppb (parts per billion) or less. The deoxygenated water is directed from the GTM device into the wet fire protection system pipes.

Another embodiment relates to a corrosion-inhibiting wet fire protection system (FPS) in a building having a water supply. The FPS includes at least one pipe. Each pipe includes a plurality of automatically activated valves operative to open and discharge water in the event of a fire. The FPS also includes at least one gas fill valve and one gas purge valve in one or more pipes. The gas fill and purge valves are located at spaced-apart distances. The FPS further includes a Gas Transfer Membrane (GTM) deoxygenating device. The GTM device is connected in fluid flow relationship with the pipes via a fluid fill valve. The GTM device is operative to deoxygenate building supply water to a concentration of 500 ppb (parts per billion) or less in a single pass. The FPS additionally includes a nitrogen gas source connected to the at least one fill valve and to the GTM device. The FPS also includes a controller operative to control the gas fill valve, gas purge valve, nitrogen gas source, and GTM device. The controller controls these elements to displace atmospheric oxygen in the pipes with nitrogen gas by injecting nitrogen gas into at least one fill valve and discharging oxygen displaced by the nitrogen gas via at least one purge valve. After purging oxygen from the pipes, the controller directs water from the building water supply through the GTM device, where it is deoxygenated to an oxygen concentration of 500 ppb (parts per billion) or less. At the same time the N2 sweep gas to the GTM can saturate the fill water with Nitrogen to allow for outgassing of N2 into the gas pockets allowing for higher level of corrosion protection. The deoxygenated water is then directed from the GTM device into the wet FPS pipes.

DETAILED DESCRIPTION

Figure 1:
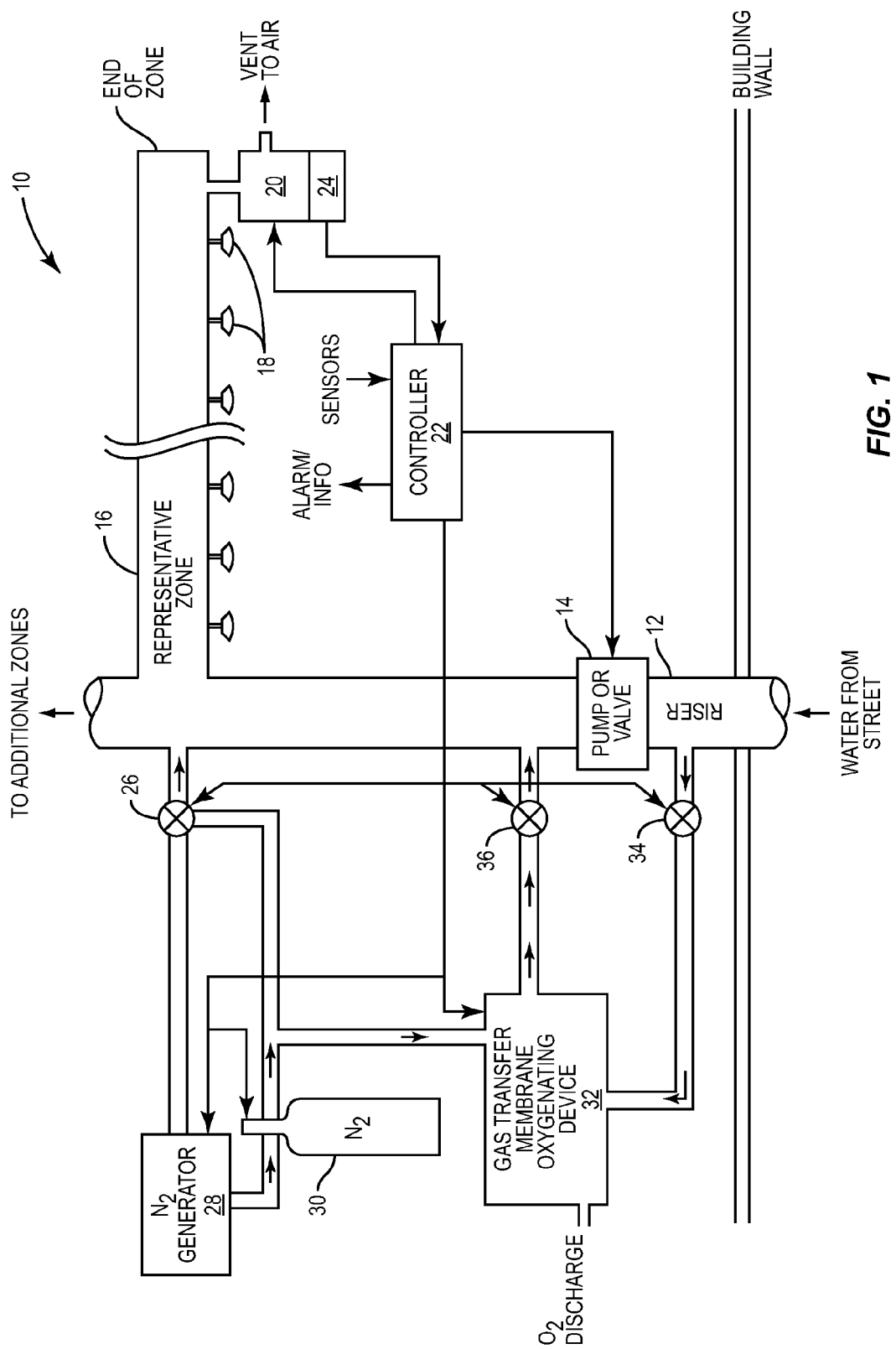
FIG. 1 is a functional block diagram of a corrosion-inhibiting wet Fire Protection System.

FIG. 1 depicts, in functional schematic form, a corrosion-inhibiting wet Fire Protection System (FPS) 10, according to a representative embodiment of the present invention, which inhibits Microbiologically Influenced Corrosion (MIC) and/ or galvanic corrosion and thus prevents or minimizes corrosion-induced leaks to the system. Once configured and charged, the corrosion-inhibiting wet FPS 10 operates similarly to a conventional wet FPS; the corrosion-inhibiting wet FPS 10 differs in its initialization and charging. In particular, air in the corrosion-inhibiting wet FPS 10 piping is purged of atmospheric oxygen (O2) prior to charging by displacing it with an inert gas. The system 10 is then charged with water from the building supply that is dynamically deoxygenated and saturated with inert gas as the FPS 10 piping is filled. This combination virtually eliminates O2 from the interior volume of the corrosion-inhibiting wet FPS 10 piping, thus inhibiting or eliminating corrosion over extended durations by suppressing oxidation. In a presently preferred embodiment, the inert gas is nitrogen ($N_2$), due to the ease and low cost of extracting high-purity nitrogen from ambient air. However, any non-reactive gas, such as helium, neon, argon, or the like, may be utilized within the scope of the present invention.

The corrosion-resistant wet FPS 10 includes all of the functions and features of a conventional wet FPS. Indeed, most of the elements depicted in FIG. 1 to the right of the dashed vertical line are present in a conventional wet FPS. These include a riser 12 connected to a reliable source of water, such as local city water as it enters the building. A pump or valve 14 isolates the riser 12 from one or more FPS zones 16. Although depicted schematically as a single pipe, an FPS zone 16 may comprise a small network of pipes, such as required to cover a floor of a building, a particular portion of a floor, or the like. Disposed at regular intervals along each zone 16 pipe is a plurality of sprinkler heads 18. As discussed above, a sprinkler head 18 is a normally-closed valve that is automatically actuated in the event of a fire, to release water from the FPS 10 for fire suppression.

At the end of or at various locations within each zone 16 at least one purge valve 20 may be opened to vent atmospheric air from the interior of the zone 16 pipes. In one embodiment, the purge valve 20 is actuated under the control of a controller 22, via a wired or wireless connection. In other embodiments, the purge valve is 20 may be manually actuated. In one embodiment, an O2 sensor 24 may additionally be disposed at the end of each FPS zone 16. The O2 sensor 24 is operative to detect and quantify the concentration of O2 in air or other gas being vented by the purge valve 20. In one embodiment, the O2 sensor 24 is operative to communicate a sensed O2 concentration to the controller 22, via a wired or wireless connection. In other embodiments, the O2 sensor 24 includes a gauge or other display that is read manually.

The controller 22 may additionally receive input from one or more sensors (not depicted). For example, a pressure sensor disposed in the zone 16 piping may detect a drop in water pressure, indicating that a sprinkler head 18 has opened, triggering the controller 22 to activated or open the pump or valve 14. Additionally, the controller 22 may receive inputs from smoke detectors, heat sensors, and the like. The controller 22 may additionally generate outputs, such as an alarm indication if a fire is detected, routine status and operating parameter outputs, and the like. In particular, the controller 22 may communicate with, or may indeed form a part of, a building-wide automated maintenance system, that includes and controls fire detection and suppression, access and security functions, HVAC, lighting, and the like.

According to embodiments of the present invention, the corrosion-inhibiting wet FPS 10 of the present invention is initialized and charged in a way that virtually eliminates O2 from the interior volume of FPS 10 pipes, and maintains that O2-free environment.

Prior to charging the corrosion-inhibiting wet FPS 10, atmospheric air is purged from the zone 16 piping by displacing it with an inert gas, such as nitrogen (N2). To facilitate this, a N2 generator 28 may be provided and selectively coupled to the FPS 10 pipes via a normally-closed fill valve 26. In a permanent installation, the N2 generator and fill valve 26 may be controlled by the controller 22, via a wired or wireless connection. A suitable N2 generator 28 is the MICBlast™ or the N2-Blast™ FPS Nitrogen Generator, available from South-Tek Systems of Wilmington, N.C. In one embodiment, the N2 generator 28 preferably generates N2 of 95% or greater purity. In one embodiment, the N2 generator 28 preferably generates N2 of 98% or greater purity. In one embodiment, the N2 generator 28 preferably generates N2 of 99.9% or greater purity.

Reserve nitrogen may be generated and stored in a tank 30. In one embodiment, for example in a small building with only one or a few zones 16, a N2 generator 28 may not be required, and sufficient N2 may be supplied by a portable tank 30 provided on-site only for the initialization and charging of the FPS 10. In this case, the N2 generator 28 is located off-site.

In either case, prior to charging the corrosion-inhibiting wet FPS 10 by introducing water into the zone 16 piping, atmospheric air (which includes approximately 20.8% O2 by volume) is purged from the zone 16 piping. To accomplish this, both the purge valve 20 and fill valve 26 are opened, and either the N2 generator is actuated or the N2 tank 30 is opened. The gas purged from the zone 16 piping is monitored by the O2 sensor 24. When the gas escaping from the purge valve 20 is sufficiently oxygen-free (e.g., when the N2 has displaced all atmospheric air in the pipes), the purge valve 20 and fill valve 26 are closed. In some embodiments, the air purging operation may include additional steps, such as over-pressurizing the zone 16 piping with N2 to well over atmospheric pressure, incrementally bleeding gas from the purge valve 20 and periodically injecting N2 gas at the fill valve 26, until the desired concentration of N2 is achieved.

After O2 has been purged from the zone 16 piping, and the corrosion-inhibiting wet FPS 10 is charged with deoxygenated water. Typically, water contains approximately 10 to 14 ppm (parts per million) O2 near freezing, decreasing to about 6 to 10 ppm O2 at 45° C. Water is considered to be hypoxic when it contains less than 0.2 ppm O2. Water completely devoid of O2 is called anoxic. As used herein, the term "deoxygenated water" includes both hypoxic and anoxic water. In particular, as used herein, the term "deoxygenated water" for corrosion inhibiting purposes means water with an O2 concentration of 500 ppb (parts per billion) or less. The O2 concentration of water will vary with temperature. In one embodiment, the oxygenated water preferably has an O2 concentration of 300 ppb or less. In one embodiment, the oxygenated water preferably has an O2 concentration of 150 ppb or less.

A recent development in the industry is the Gas Transfer Membrane (GTM) method of deoxygenation. With the main pump or valve 14 closed and the zone 16 piping flooded with N2 gas, a GTM device 32 receives supply water from the street supply via valve 34 (under the control of controller 22), and N2 gas from the N2 generator 28 or tank 30. The GTM device 32 removes dissolved O2 molecules from the water, as described in greater detail herein and the water through the GTM may become saturated with N2 gas.

Deoxygenated water from the GTM device 32 is injected into the riser 12 via valve 36 (under the control of controller 22), downstream of the main pump or valve 14, to fill the FPS pipes. The controller 22 may open one or more purge valves 20 to discharge N2 gas displaced by the deoxygenated water. The GTM device 32 may supply deoxygenated water at flow rates of up to 1000 gal/hr. In installations where a higher flow rate is required to fill the FPS zone 16 piping in a reasonable time, multiple GTM devices 32 may be configured in parallel, with concomitant additional piping and flow control valves. The GTM device 32 eliminates the need for a water recirculation tank, and by eliminating the recirculation necessary in known deoxygenation processes, dramatically reduces the time and cost required to deoxygenate water when filling a wet FPS system 10. A suitable GTM device 32 is available from the Membrana company of Charlotte, N.C.

Ideally, the deoxygenated water should fully fill the interior volume of all zone 16 pipes. In practice, there will be at least some voids in which N2 gas remains. However, because the charging water has been deoxygenated, there is essentially no dissolved oxygen to offgas into the N2-filled spaces, and hence no free oxygen is available for the oxidation processes that cause corrosion, or to support microorganisms involved in MIC. Furthermore, absent some significant leak in the system, there is no mechanism for O2 to enter the pipes; hence, embodiments of the present invention provide a long-term corrosion-inhibiting solution.

Figure 2:
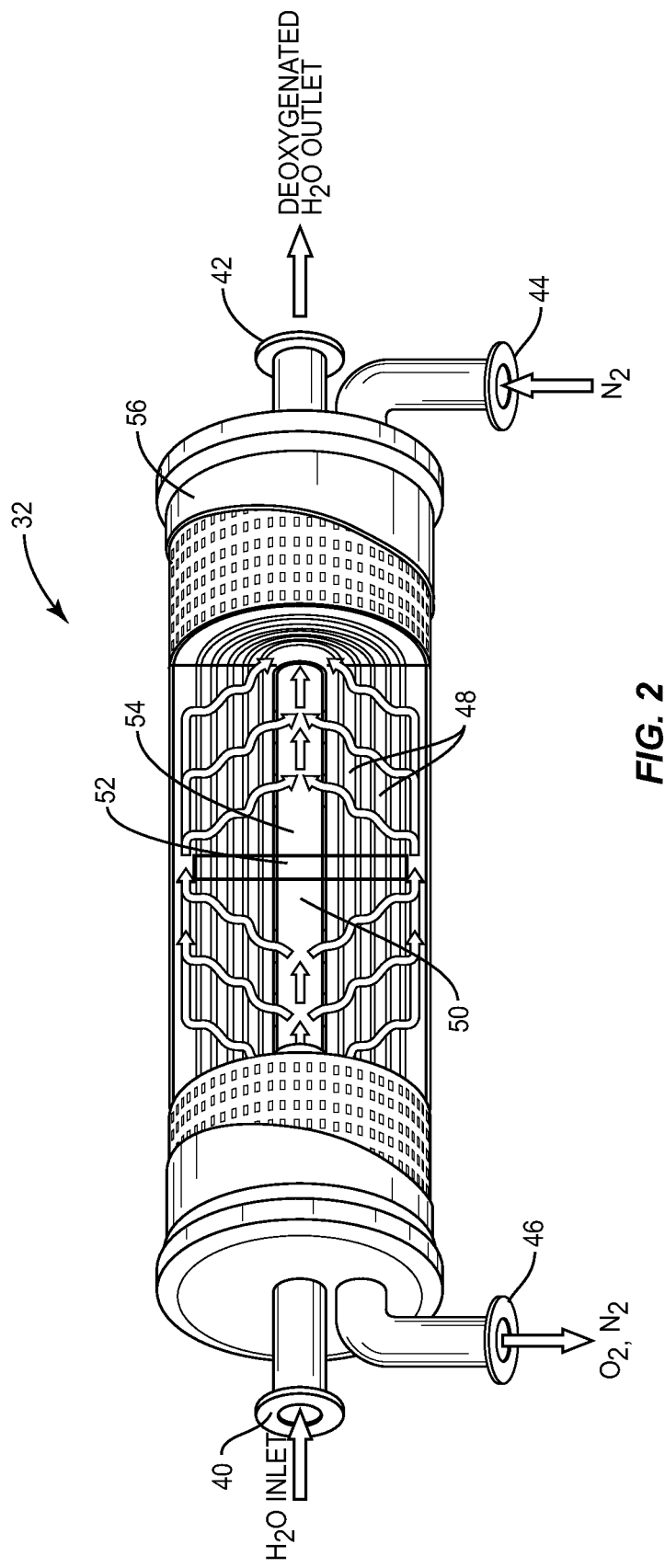
FIG. 2 is a partial sectional diagram of a Gas Transfer Membrane (GTM) deoxygenating device.

FIG. 2 depicts the structure and operation of the Gas Transfer Membrane deoxygenating device 32. The GTM device 32 includes a street water inlet 40 and deoxygenated water outlet 42, as well as an N2 sweep gas inlet 44 and gas discharge 46. The GTM device 32 uses a membrane array 48 knit from microporous, hydrophobic, hollow fibers to remove dissolved O2 from supply water. The fibers may be approximately 300 um in diameter, with approximately 0.03 um diameter pores formed in the fiber walls. The device 32 additionally dissolves N2 molecules into the water, which further assists corrosion resistance in the FPS 10 piping.

The array 48 is wrapped around a center tube 50 inside of the GEM device 32 housing 56. During FPS 10 fill operations, water flows over the outside of the hollow fibers while high-purity N2 gas flows through the inside of the fibers. The water enters a distribution tube 50, and is directed outwardly through the array 48 by a baffle 52. On the other side of the baffle 52, the water is directed back inwardly through the array 48 and into a collection tube 54. N2 gas entering the device 32 at the gas inlet 44 is directed down the interior of the fibers comprising the array 48, in an opposite direction to that of the H2O flow. In other embodiments, this arrangement may be reversed, with water flowing through the fibers and N2 gas flowing around them. Because the membrane is hydrophobic, it acts as an inert support that allows direct contact between the N2 gas and liquid phase H2O without dispersion. Applying a higher pressure to the H2O stream relative to the N2 stream creates the driving force for dissolved O2 gas in the H2O to pass through the membrane pores into the interior of the hollow fibers. The O2 gas is carried away by the N2 gas flow, through the hollow fibers, to the gas discharge 46.

Figure 3:
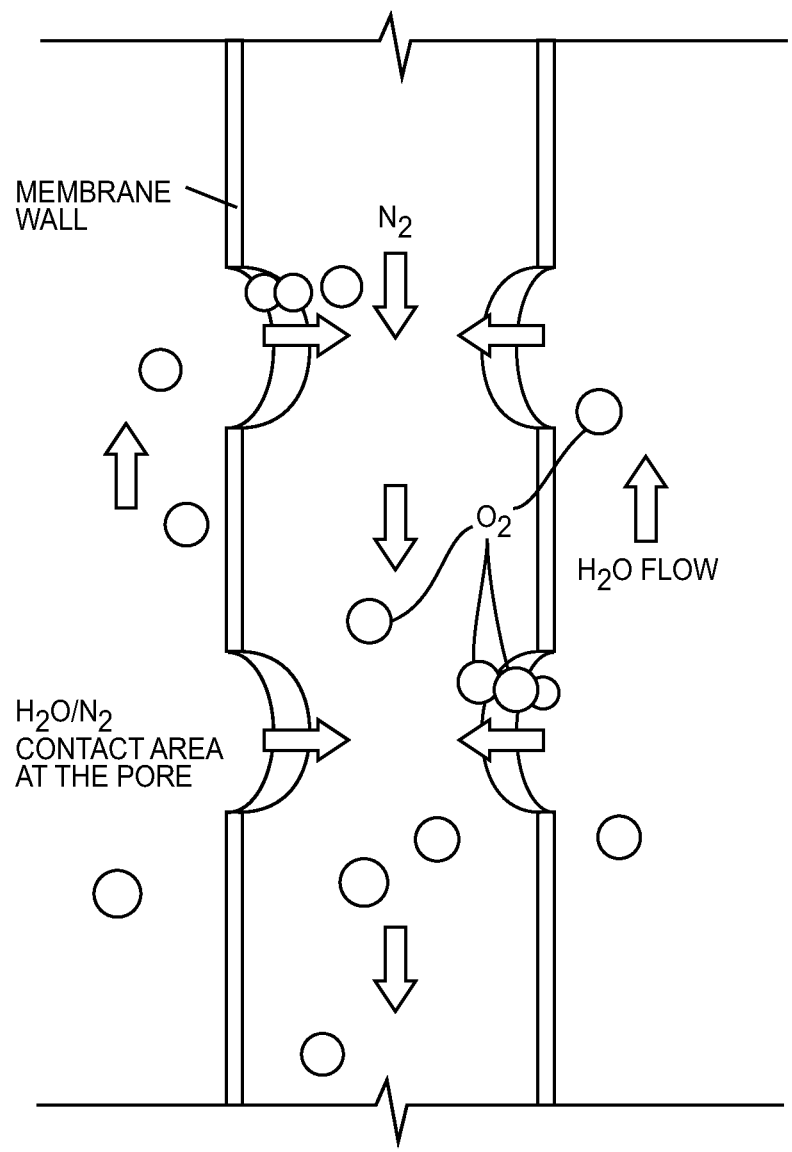
FIG. 3 is a sectional diagram of a microporous, hollow fiber used in the GTM device of FIG. 3.
Figure 4:
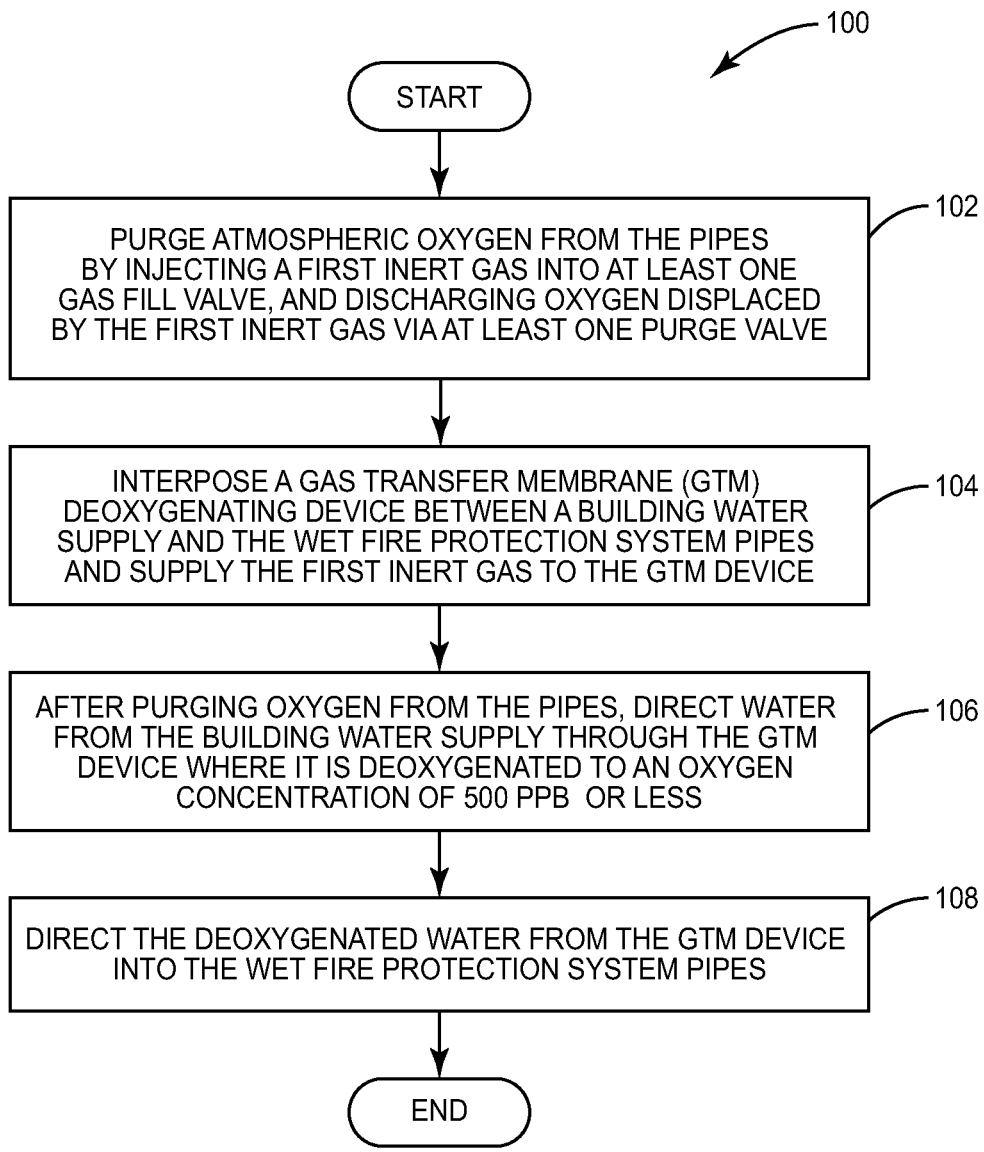
FIG. 4 is a flow diagram of a method of suppressing corrosion in a wet Fire Protection System.

FIG. 3 depicts a sectional view of an individual microporous, hydrophobic, hollow fiber of the membrane array 48. Water flows around the outside of the fiber (in an upward direction, as depicted in FIG. 3). N2 gas flows through the fiber (downwardly, as depicted in FIG. 3). The greater H2O pressure forces free O2 molecules to disperse from the H2O into the fiber, at the liquid/gas contact points at each micropore in the fiber. Due to the much greater concentration of N2 molecules than O2, this process additionally dissolves some N2 molecules into the deoxygenated water. This feature that aids in corrosion resistance, since at the interface between deoxygenated water and any residual N2 gas pockets in the FPS piping, the only dissolved gas to diffuse out of the deoxygenated water is N2 gas, which further suppresses bacteriological activity, and hence MIC corrosion.

At flow rates up to 1000 gal/hr, the GTM device 32 can deoxygenate typical street water to levels at or below 300 ppb of O2. For higher flow rates, multiple GTM devices 32 may be configured in parallel. To achieve greater deoxygenation, without a reduction in flow rate, a larger size GTM device 32 may be used, or multiple GTM devices 32 may be configured in serial. By generating deoxygenated water "on the fly" from ordinary building supply water, embodiments of the present invention eliminate the need for a bulky, heavy water reuse tank, and vastly increase the speed of deoxygenating water over the recirculation methods known in the art. An additional value to this art is by decreasing the deoxygenated water fill time, the fire protection system if off line for less time during such fill operation versus prior deoxygenated water fill methods.

FIG. 2 depicts a flow diagram of the steps of a method 100 of suppressing corrosion in a wet FPS 10. The corrosion-inhibiting wet FPS 10 includes at least one pipe, and each pipe includes a plurality of automatically activated valves 18 operative to open and discharge water in the event of a fire. The corrosion-inhibiting wet FPS 10 further includes at least a fill valve 26 and a purge valve 20 located at spaced-apart distances in one or more pipes. The method begins by purging atmospheric oxygen from the pipes by injecting an inert gas into at least the fill valve 26, and discharging oxygen displaced by the inert gas via at least the purge valve 20 (block 102). After purging O2 from the pipes, the method continues by filling the pipes with deoxygenated water having an O2 concentration of 500 ppm or less (block 104). In particular, this method steps may comprise opening the purge valve 20 to allow the inert gas to escape while pumping deoxygenated water into the zone 16 from a deoxygenated water tank 34, and then closing the purge valve 20. Finally, after filling the pipes with deoxygenated water, the method continues by connecting the zone 16 pipes to a source of water (e.g., via pump or valve 14) having sufficient pressure to expel water from at least one automatically activated valve 20 in the event of a fire. Although the non-deoxygenated water includes dissolved oxygen, all of the FPS 10 pipes downstream of the main pump or valve 14 are full of deoxygenated water, and little of the non-deoxygenated water will mix therewith. In particular, no non-deoxygenated water will migrate to the near-horizontal zone 16 pipes, in which corrosion is a concern.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of suppressing corrosion in a wet fire protection system including at least one pipe, each pipe including a plurality of automatically activated valves operative to open and discharge water in the event of a fire, the system further including at least gas fill and purge valves located at spaced-apart distances in one or more pipes, the method comprising:

purging atmospheric oxygen from the pipes by injecting a first inert gas into at least one gas fill valve, and discharging oxygen displaced by the first inert gas via at least one gas purge valve; and interposing a Gas Transfer Membrane (GTM) deoxygenating device between a building water supply and the wet fire protection system pipes and supplying the first inert gas to the GTM device, wherein the GTM deoxygenating device is operative to intake the water from the building water supply and the first inert gas, remove dissolved oxygen from the water using a membrane array knit from microporous, hydrophobic, hollow fibers, and output deoxygenated water and waste gasses including oxygen removed from the water; and after purging oxygen from the pipes, directing water from the building water supply through the GTM device where it is deoxygenated to an oxygen concentration of 500 ppb (parts per billion) or less; and directing the deoxygenated water from the GTM device into the wet fire protection system pipes.

2. The method of claim 1 wherein the first inert gas comprises nitrogen (N2).

3. The method of claim 2 wherein the first inert gas is at least 95% pure N2.

4. The method of claim 3 wherein the first inert gas is at least 98% pure N2.

5. The method of claim 1 wherein the deoxygenated water has an O2 concentration of less than 300 ppb.

6. The method of claim 5 wherein the deoxygenated water has an O2 concentration of less than 150 ppb.

7. The method of claim 1 further comprising:

after filling the pipes with deoxygenated water, connecting the pipes to a source of water having sufficient pressure to expel water from at least one automatically activated valve in the event of a fire.

8. A corrosion-inhibiting wet fire protection system in a building having a water supply, comprising:

at least one pipe, each pipe including a plurality of automatically activated valves operative to open and discharge water in the event of a fire;

at least one gas fill valve and one gas purge valve in one or more pipes, the gas fill and purge valves located at spaced-apart distances;

a Gas Transfer Membrane (GTM) deoxygenating device connected in fluid flow relationship with the pipes via a fluid fill valve, the GTM device operative to intake building supply water and nitrogen gas, deoxygenate the water to a concentration of 500 ppb (parts per billion) in a single pass using a membrane array knit from microporous, hydrophobic, hollow fibers, and output deoxygenated water and waste gasses including oxygen removed from the water;

a nitrogen gas source connected to the at least one fill valve and to the GTM device; and a controller operative to control the gas fill valve, gas purge valve, nitrogen gas source, and GTM device to:

displace atmospheric oxygen in the pipes with nitrogen gas by injecting nitrogen gas into at least one fill valve and discharging oxygen displaced by the nitrogen gas via at least one purge valve; and after purging oxygen from the pipes, direct water from the building water supply through the GTM device, where it is deoxygenated to an oxygen concentration of 500 ppb (parts per billion) or less, and direct the deoxygenated water from the GTM device into the wet fire protection system pipes.

9. The system of claim 8, further comprising main pump or valve operative to direct building supply water into the pipes in response to one or more automatically activated valves opening and discharging water in the event of a fire.

\* \* \* \* \*